(12) United States Patent
Krueger et al.

(10) Patent No.: US 8,789,677 B2
(45) Date of Patent: Jul. 29, 2014

(54) ADJUSTMENT DEVICE FOR ADJUSTING A VEHICLE SEAT COMPONENT

(75) Inventors: Frieder Krueger, Coburg (DE); André Blinzler, Grub (DE); Stephanie Hartleb, Weidhausen (DE); Juergen Siller, Roedental (DE); Matthias Weiss, Roedental (DE); Andreas Weder, Untersiemau (DE); Volker Moeller, Coburg (DE)

(73) Assignee: Brose Fahrzeugteile GmbH & Co. KG Coburg, Coburg (DE)

( * ) Notice: Subject to any disclaimer, the term of this patent is extended or adjusted under 35 U.S.C. 154(b) by 285 days.

(21) Appl. No.: 13/144,076

(22) PCT Filed: Jan. 13, 2010

(86) PCT No.: PCT/EP2010/050318
§ 371 (c)(1),
(2), (4) Date: Aug. 30, 2011

(87) PCT Pub. No.: WO2010/081808
PCT Pub. Date: Jul. 22, 2010

(65) Prior Publication Data
US 2011/0304190 A1    Dec. 15, 2011

(30) Foreign Application Priority Data
Jan. 14, 2009    (DE) .......................... 10 2009 005 044

(51) Int. Cl.
*B60N 2/22*    (2006.01)
*B60N 2/44*    (2006.01)

(52) U.S. Cl.
USPC .......................................... 192/223; 267/374

(58) Field of Classification Search
USPC ................................ 192/223, 223.1; 297/374
See application file for complete search history.

(56) References Cited

U.S. PATENT DOCUMENTS 4,786,110 A    11/1988    Mahling et al.
5,755,491 A *    5/1998    Baloche et al. ............... 297/362
(Continued)

FOREIGN PATENT DOCUMENTS

CN    1628042 A    6/2005
DE    36 24 018 A1    2/1988
(Continued)

OTHER PUBLICATIONS

English Translation of International Preliminary Report on Patentability dated Jul. 19, 2011, for corresponding PCT/EP2010/050318, 7 sheets.
(Continued)

*Primary Examiner* — Richard M. Lorence
(74) *Attorney, Agent, or Firm* — Christie, Parker & Hale, LLP (57) ABSTRACT

An adjustment device for adjusting a vehicle seat component is provided. The adjustment device comprising a rotary fitting for adjusting the vehicle seat component, which includes a first fitting part and a second fitting part pivotally mounted with respect to the first fitting part about an axis of rotation, a drive device connected with the rotary fitting for driving the rotary fitting, and an adjustment element of the drive device for actuating the drive device. The drive device is formed to transmit a force present on the adjustment element on the drive side for adjusting the vehicle seat component to the rotary fitting, but to block a force present on the rotary fitting on the output side. For blocking the output-side force the drive device includes a brake section fixedly arranged on the first fitting part and at least one brake segment which in the presence of an output-side force at the rotary fitting cooperates with the brake section in a braking manner via a contact surface in the manner of a shoe brake.

19 Claims, 10 Drawing Sheets

(56) References Cited

U.S. PATENT DOCUMENTS

| | | | |
|---|---|---|---|
| 5,794,479 A | 8/1998 | Schwarzbich | |
| 5,881,854 A * | 3/1999 | Rougnon-Glasson | 192/15 |
| 6,305,748 B1 * | 10/2001 | Ohba | 297/362 |
| 6,702,089 B1 | 3/2004 | Scheck et al. | |
| 7,182,196 B2 | 2/2007 | Weber | |
| 7,198,330 B2 | 4/2007 | Wahlen et al. | |
| 7,455,361 B2 * | 11/2008 | Stemmer et al. | 297/362 |
| 7,789,464 B2 | 9/2010 | Stemmer et al. | |
| 2003/0173182 A1 | 9/2003 | Kim | |
| 2005/0231017 A1 * | 10/2005 | Lange | 297/374 |
| 2008/0193203 A1 | 8/2008 | Voss et al. | |

FOREIGN PATENT DOCUMENTS

| | | |
|---|---|---|
| DE | 40 23 824 C3 | 2/1992 |
| DE | 41 20 617 A1 | 12/1992 |
| DE | 199 54 232 A1 | 6/2001 |
| DE | 44 05 870 C2 | 6/2003 |
| DE | 102 07 846 A1 | 8/2003 |
| DE | 102 45 620 A1 | 4/2004 |
| DE | 198 07 790 B4 | 5/2004 |
| DE | 103 35 869 A1 | 3/2005 |
| DE | 103 38 306 A1 | 3/2005 |
| DE | 10 2005 028 779 B4 | 12/2006 |
| DE | 10 2005 054 489 B4 | 1/2008 |
| EP | 0 743 221 A2 | 11/1996 |
| GB | 1 224 078 | 3/1971 |
| WO | WO 03/066369 A1 | 8/2003 |

OTHER PUBLICATIONS

Chinese Examination Report for Application No. CN 201080004630.6, dated Nov. 13, 2012 (7 pages) and English translation (10 pages).

International Search Report, dated Jul. 26, 2010, corresponding to PCT/EP2010/050318, 8 pages.

* cited by examiner

ADJUSTMENT DEVICE FOR ADJUSTING A VEHICLE SEAT COMPONENT

CROSS-REFERENCE TO A RELATED APPLICATION

This application is a National Phase Patent Application of International Patent Application Number PCT/EP2010/050318, filed on Jan. 13, 2010, which claims priority of German Patent Application Number 10 2009 005 044.2, filed on Jan. 14, 2009.

BACKGROUND

This invention relates to an adjustment device for adjusting a vehicle seat component.

Such adjustment device includes
a rotary fitting for adjusting the vehicle seat component with a first fitting part and a second fitting part pivotally mounted with respect to the first fitting part,
a drive device connected with the rotary fitting for driving the rotary fitting, and
an adjustment element of the drive device for actuating the drive device.

The drive device is formed to transmit a force present on the adjustment element on the drive side for adjusting the vehicle seat component to the rotary fitting, but to block a force present on the rotary fitting on the output side in the manner of a load moment lock.

In an adjustment device known from DE 10 2005 028 779 B4, which is formed as rotary fitting for a backrest inclination adjuster of a backrest of a vehicle seat, a first fitting part connected with a seat part of the vehicle seat is coupled via a transmission with a second fitting part connected with the backrest such that by rotating a hand wheel the first fitting part can be shifted relative to the second fitting part. Via the hand wheel an adjustment force can be introduced into the rotary fitting, as a result of which the two fitting parts are shifted relative to each other.

To prevent that when a force is present on the rotary fitting on the output side, i.e. for example when the backrest is loaded by a vehicle occupant, the adjustment device is shifted, DE 10 2005 028 779 B4 provides a so-called wrap spring brake with a wrap spring which frictionally contacts a cylindrical housing in the presence of an output-side force and hence introduces the output-side force into the stationary seat frame. However, if an adjustment force is present on the hand wheel on the drive side, the wrap spring is released from its frictional contact, so that the adjustment device can be shifted.

Other forms of adjustment devices with a wrap spring brake are known from DE 40 23 824 C3 and from DE 36 24 018 A1.

By using a wrap spring brake, the shifting of an adjustment device by a force present on the output side can reliably be prevented. In the released condition with actuated wrap spring, a wrap spring brake however also has a comparatively large frictional moment, so that the shifting of the adjustment device requires a comparatively great effort and in addition the wear is increased.

SUMMARY

It is the object of the present invention to provide an adjustment device for adjusting a vehicle seat component, which on the one hand safely and reliably blocks a force present on the output side and on the other hand can transmit a force introduced on the drive side in a low-friction manner.

It is provided that for blocking the output-side force the drive device includes a brake section fixedly arranged on the first fitting part and at least one brake segment which in the presence of an output-side force at the rotary fitting cooperates with the brake section in a braking manner in the manner of a shoe brake via a contact surface.

The idea underlying the present invention consists in that instead of a wrap spring for braking a force present on the output side, one or more brake segments are used, which in the presence of an output-side force frictionally contact a stationary brake section and hence block the output-side force by frictional connection. The brake section formed for example by a cylindrical brake pot and the at least one brake segment are formed in the manner of a shoe brake and under an output side load cooperate in a braking manner due to static friction. However, if a drive-side adjustment force is exerted on the adjustment element of the drive device, the adjustment element actuates the at least one brake segment and thereby eliminates the frictional contact, so that the drive device can be actuated without much effort for adjusting the vehicle seat component.

The adjustment element can be formed as manually operable hand wheel. In principle, however, it is also conceivable to electrically drive the adjustment element via an electric motor for adjusting the vehicle seat component.

The adjustment device can be formed for example as a seat adjuster for adjusting the backrest inclination of a backrest of a vehicle seat. In this configuration, the drive device drives the rotary fitting for adjusting the backrest, wherein via the at least one brake segment of the drive device a force present on the output side when a load is exerted on the backrest by a vehicle occupant is blocked and introduced into a seat frame, but does not lead to a shifting of the adjustment device.

When the brake section is formed as cylindrical brake pot, the at least one brake segment is arranged within the brake pot and is frictionally connected with an inner shell surface of the brake pot, in order to achieve the braking effect.

The at least one brake segment advantageously is arranged on a drive element, which is non-rotatably coupled with a shaft operatively connected with the second fitting part. In a concrete configuration, the at least one brake segment supports on the drive element via a supporting portion such that in the presence of an output-side force a frictional contact is made between the drive element non-rotatably connected with the shaft and the stationary brake section and the force present on the shaft on the output side hence is introduced into the brake section. The brake section for example can be connected with a seat-side fitting part of the rotary fitting and the shaft can be connected with a backrest-side fitting part, so that in the presence of a backrest-side force the same does not lead to a shifting of the adjustment device, but is introduced into the seat-side fitting part via the brake section.

The supporting portion, via which the at least one brake segment supports on the drive element, can be formed for example as a partly overmolded sheet-metal part firmly connected with the drive element. The drive element itself is fabricated as a plastic part, for example as an injection-molded plastic part, and is reinforced by the overmolded sheet-metal part such that the output-side forces introduced into the brake section via the drive element and the at least one brake segment are reliably transmitted.

In another exemplary configuration it is also possible to form the supporting portion as plastic portion integrally connected with the drive element, which corresponding to the strength requirements is dimensioned and reinforced for transmitting the output-side forces.

In yet another exemplary configuration it is also possible to manufacture the drive element as a whole as a metal die-cast part, for example as an aluminum die-cast part or zinc die-cast part.

To achieve the braking effect by the at least one brake segment in the presence of an output-side force, the at least one brake segment advantageously is resiliently biased with respect to the drive element into a position in which the brake segment rests against the brake section in a braking manner. For this purpose, the at least one brake segment can be biased for example by a spring element such that the at least one brake segment is urged into a rest position radially to the outside with respect to the axis of rotation. In this position, the contact surface of the brake segment rests against the brake section and frictionally brakes the drive element with respect to the brake section, when a force is acting on the drive element on the output side.

The spring element can be formed for example as compression spring or as torsion spring, which each generate a biasing force which urges the brake segment into a position radially offset to the outside with respect to the axis of rotation.

To actuate the adjustment device for shifting the vehicle seat component to be adjusted, a drive-side adjusting force is exerted on the adjustment element, which actuates the at least one brake segment for enabling the drive device. In the process, the contact surface of the brake segment previously in frictional contact with the brake section is moved against the bias into a position in which no force is transmitted from the drive element to the brake section via the brake segment. Via the adjustment element, the brake segment thus is removed from the brake section and the frictional contact between the brake section and the brake segment thereby is eliminated, so that the drive element can be shifted relative to the brake section.

The drive element and the adjustment element advantageously are pivotally mounted on the brake section. The adjustment element also is pivotally connected with the drive element, so that on the one hand drive element and adjustment element can be pivoted together relative to the brake section and on the other hand the adjustment element can also be rotated relative to the drive element by at least one predetermined pivoting angle. The pivotability of the adjustment element relative to the drive element is required to be able to actuate the at least one brake segment arranged on the drive element. By pivoting the adjustment element, the at least one brake segment thus is moved from the rest position into the enabling position and hence out of frictional contact with the brake section, so that a drive-side force can be transmitted for shifting the vehicle seat component to be adjusted. After actuating the at least one brake segment, the adjustment element becomes operatively connected with the drive element in the presence of a drive-side force and transmits the drive-side force to the drive element and via the drive element to the rotary fitting. For transmitting the drive-side force from the drive element to the rotary fitting, the same are connected with each other via a shaft.

The adjustment element is retained at the drive element for example via a locking element. The locking element preferably initially serves as transport lock, in order to retain the adjustment element at the drive element in a pre-assembly position in which the rotary fitting and the shaft are not yet connected with the drive device. For this purpose, the locking element for example can be positively connected with the drive element. The locking element thus serves as connecting element of the drive device and provides for pre-assembling and delivering the drive device as a separate unit and only connect the same with the rotary fitting and the shaft in a subsequent assembly step. In an assembly position, after connecting the shaft with the drive device, the shaft then positively engages in a recess of the drive element for the non-rotatable connection with the drive element and is firmly connected with the locking element by crimping, so that in the assembly position the rotary fitting, the shaft and the drive device cooperate in an operative position.

In a preferred aspect, the drive device includes at least two brake segments, of which a first brake segment blocks the drive device in the presence of an output-side force directed in a first direction and a second brake segment blocks the drive device in the presence of an oppositely directed output-side force.

To achieve a rather advantageous blocking effect, four brake segments are provided in an advantageous embodiment, which are arranged on the drive element such that they are located opposite each other in pairs, but the pairs formed are offset with respect to each other axially to the axis of rotation. The two pairs of the brake segments thus lie in different planes, wherein one brake segment each of a pair blocks the drive device in the presence of an output-side force directed in a first direction and the other brake segment each blocks the drive device in the presence of an oppositely directed output-side force. By providing four brake segments an arrangement is created, which provides for a symmetrical introduction of force in the blocked condition and thereby ensures a safe and reliable blocking of the drive device in the presence of an output-side force.

BRIEF DESCRIPTION OF THE DRAWINGS

The idea underlying the invention will be explained in detail below with reference to the embodiments illustrated in the Figures.

DETAILED DESCRIPTION

Figure 1:
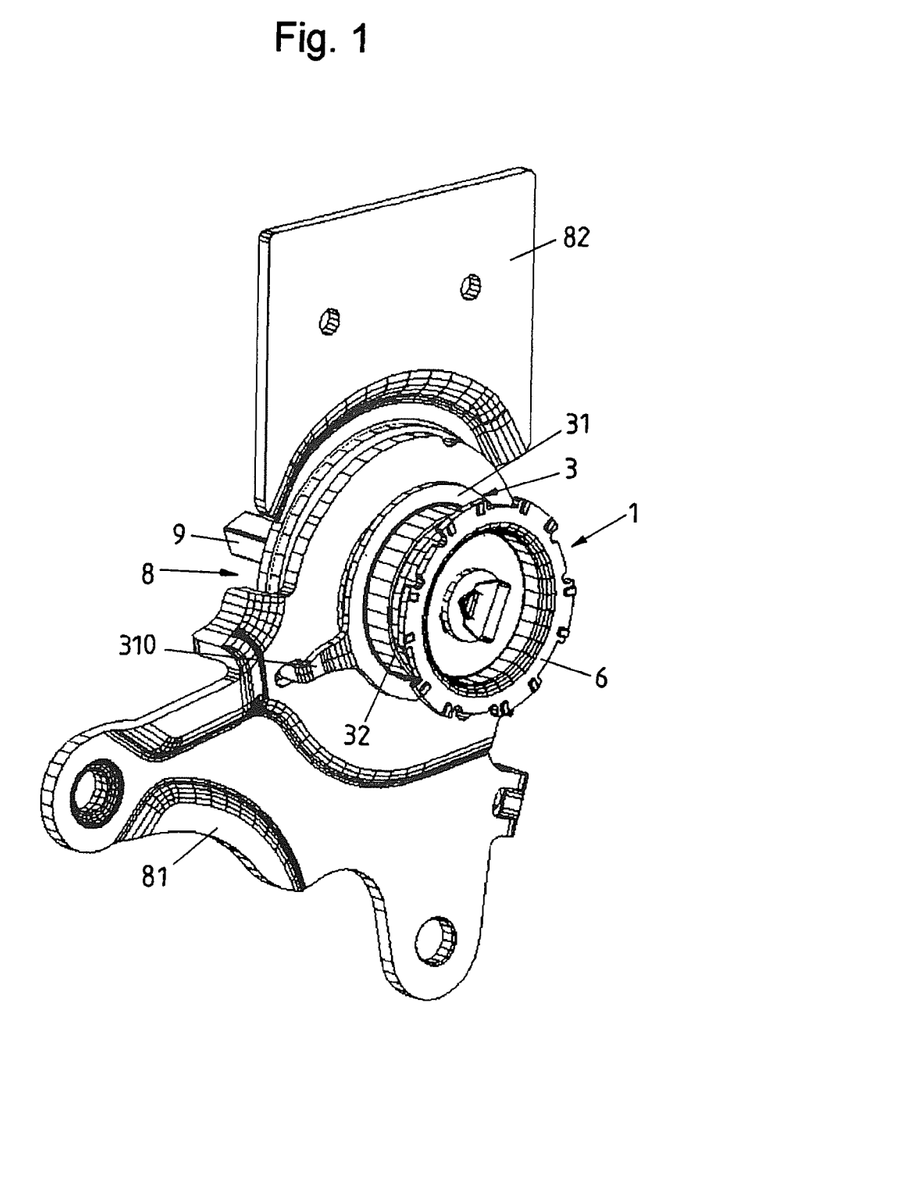
FIG. 1 shows a perspective view of an adjustment device formed as rotary fitting of a seat adjuster.

FIG. 1 shows a perspective overview of an adjustment device consisting of a drive device 1 and a rotary fitting 8 for adjusting a backrest of a vehicle seat connected with the rotary fitting 8 via an upper, second fitting part 82. Via a lower, first fitting part 81 the backrest is connected with a seat part of the vehicle seat and can be adjusted in its inclination relative to the seat part of the vehicle seat by actuating the rotary fitting 8 via the drive device 1.

To introduce an adjustment force into the vehicle seat on both sides—i.e. on the one hand on the door side and on the other hand on the tunnel side (in the center of the vehicle) of the vehicle seat—, two rotary fittings 8 regularly are arranged on the vehicle seat on both sides of the backrest and connected with each other via a shaft 9. When the rotary fitting 8 is then actuated via the drive device 1, the second rotary fitting 8 also is synchronously pivoted via the shaft 9 and the backrest connected with the fitting part 82 is shifted relative to the seat part of the vehicle seat.

In the embodiment shown in FIG. 1, the drive device 1 is formed as manual drive device and for this purpose includes an adjustment element 6 in the form of a hand wheel, of which FIG. 1 does not show the complete hand wheel, but merely a so-called hand wheel adapter, via which the adjustment device can be connected with customer-specific grip parts.

Figure 2:
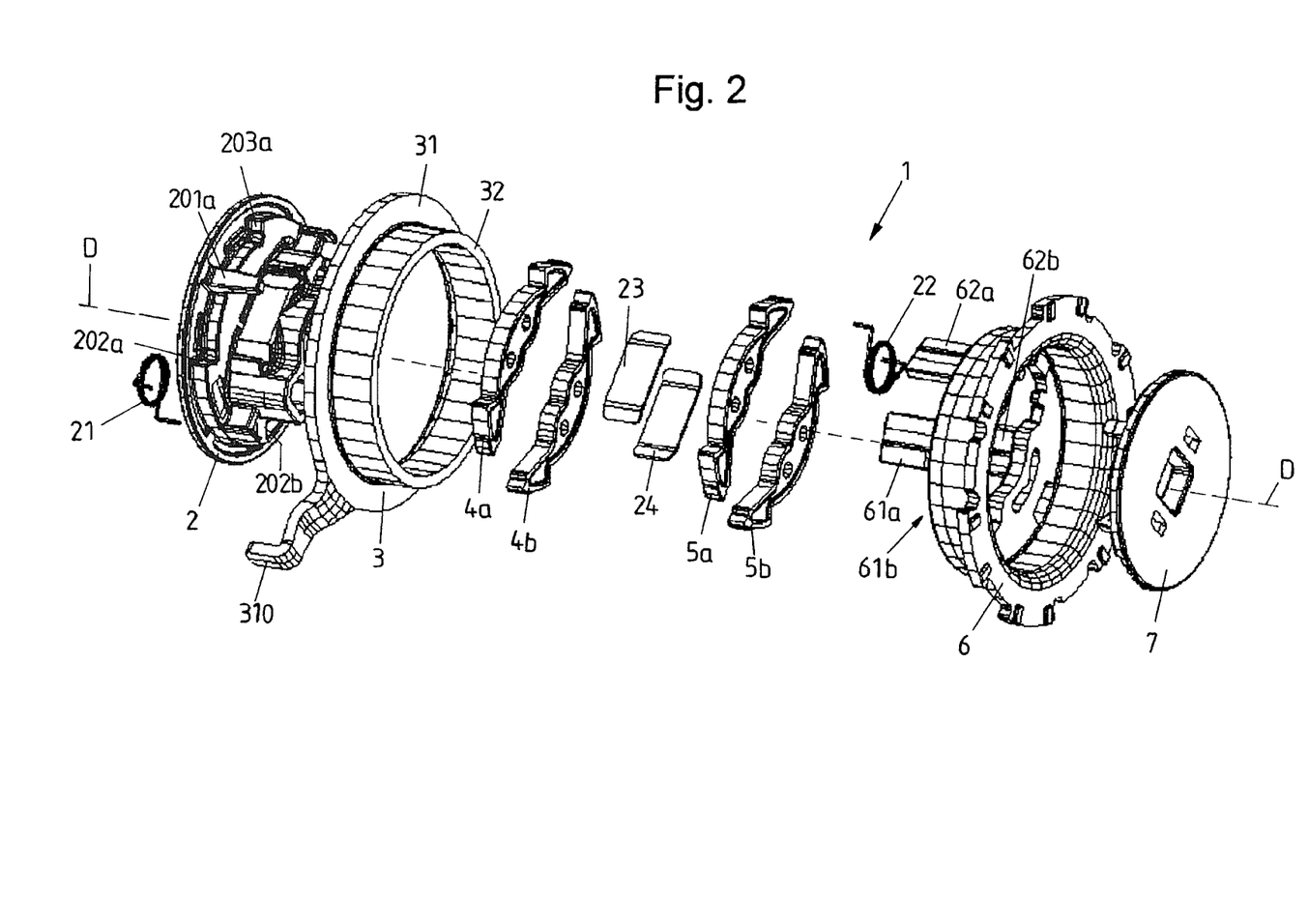
FIG. 2 shows an exploded view of the adjustment device of FIG. 1.

FIG. 2 shows an exploded view of an embodiment of the drive device 1. The drive device 1 includes a drive element 2, which is non-rotatably connected with the shaft 9 rotatable about an axis of rotation D and can be pivoted via the adjustment element 6. Via the shaft 9, the drive element 2 is connected with the upper fitting part 82 for example via a transmission in the manner of a planetary gear or an eccentric gear (see FIG. 1). The drive element 2 is pivotally arranged in a brake pot 3 which is non-rotatably connected with the first fitting part 81 via a collar 31 and a form-fit element 310 in the form of a protruding pin arranged thereon (see FIG. 1). The brake pot 3 includes a cylindrical brake jacket 32, within which the drive element 2 can be pivoted.

On the drive element 2 four brake segments 4a, 4b, 5a, 5b are arranged and supported on the drive element 2 via supporting portions 23, 24. As shown in the separate view of the drive element 2 in FIG. 13, the supporting portions 23, 24 can be connected with the drive element 2 for example as partly overmolded sheet-metal parts.

Figure 13:
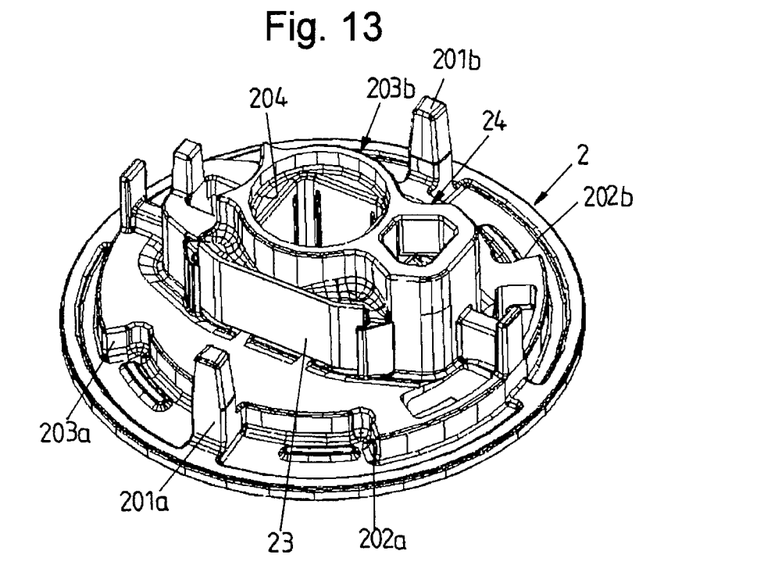
FIG. 13 shows a separate view of an embodiment of a drive element.

As is furthermore shown in FIG. 13, the drive element 2 includes a central recess 204 of square cross-section, via which the shaft 9 is positively connected with the drive element 2. On the drive element 2 two mandrels 201a, 201b are arranged, which protrude from the drive element 2 in the direction of the adjustment element 6.

Figure 3:
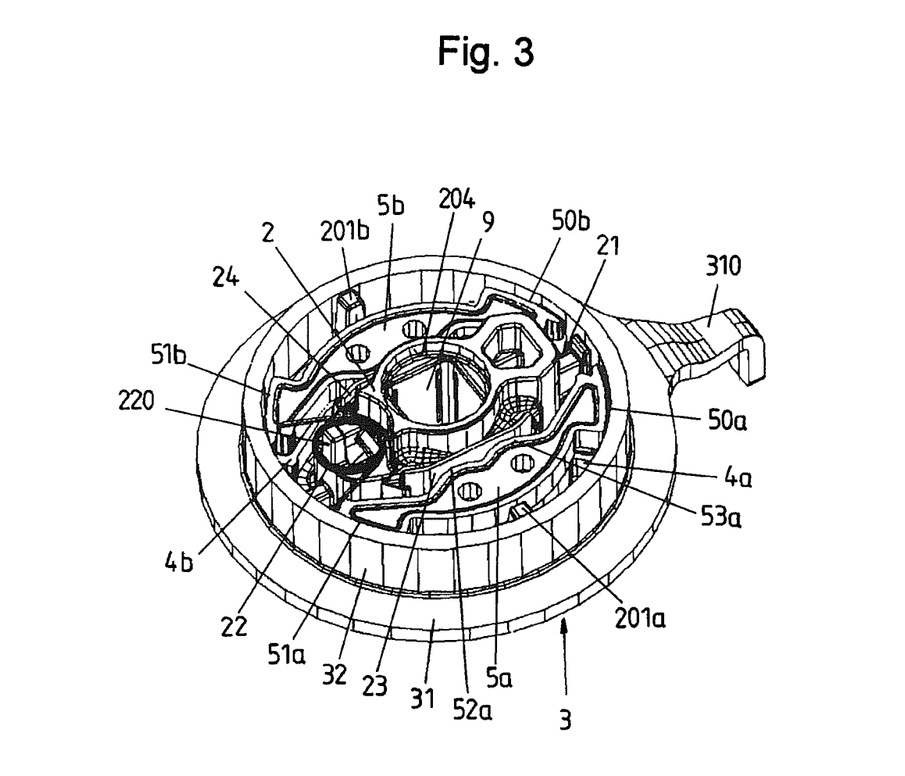
FIG. 3 shows a perspective view of a drive element with brake segments arranged thereon in a brake pot.

The brake segments 4a, 4b, 5a, 5b are biased with respect to the drive element via spring elements 21, 22 in the form of torsion springs, wherein the spring elements 21, 22 are connected with the drive element 2 via holding devices 220, as shown in FIG. 3 for the spring element 22.

The adjustment element 6, which is connected with the drive element 2 via a disk-shaped locking element 7, includes engagement elements 61a, 61b, 62a, 62b via which the adjustment element 6 can act on the brake segments 4a, 4b, 5a, 5b and transmit an adjustment force to the drive element 2 via stops 202a, 202b, 203a, 203b and via the mandrels 201a, 201b (see also the separate view of the drive element 2 in FIG. 13).

Figure 4A:
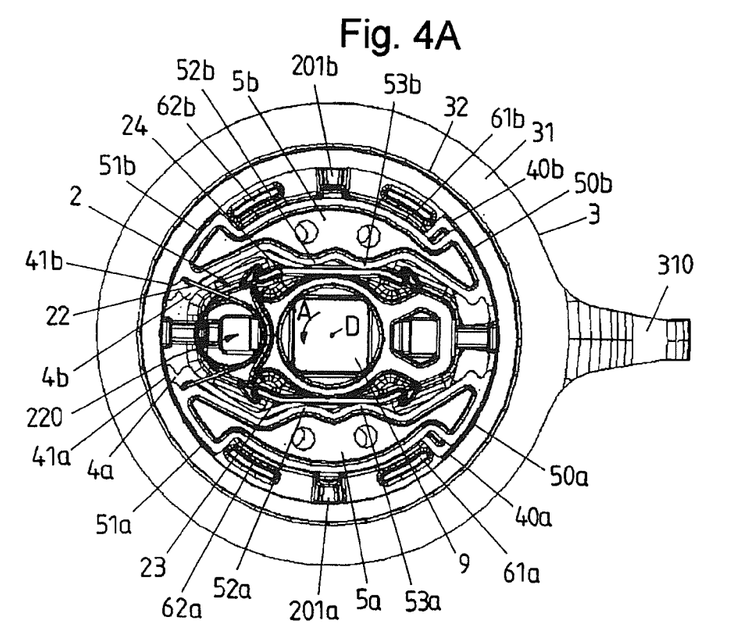
FIG. 4A shows a top view of the arrangement of FIG. 3 in the presence of an output-side force.
Figure 4B:
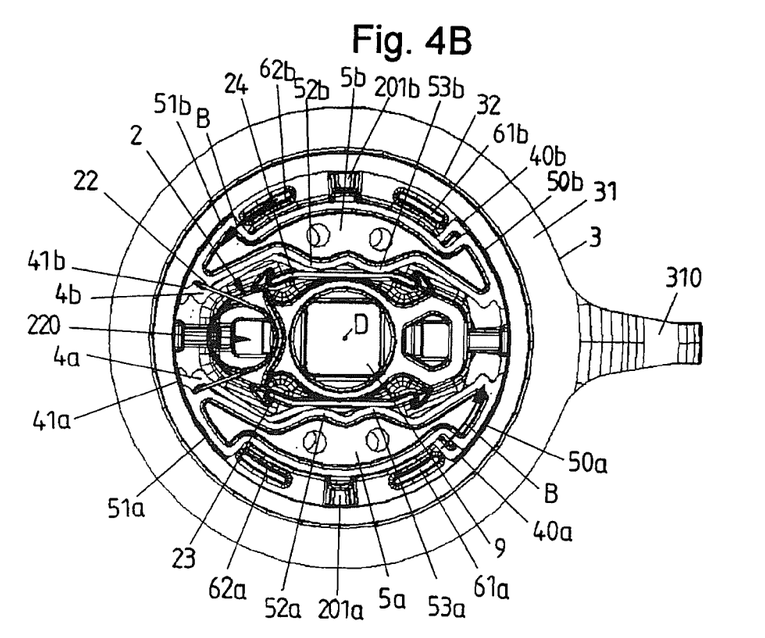
FIG. 4B shows a top view of the arrangement of FIG. 3 in the presence of a drive-side force.

With reference to FIG. 3 and FIGS. 4A, 4B the mode of operation of the drive device 1 will be explained below.

Via the drive device 1a drive-side adjustment force present at the adjustment element 6 is to be transmitted to the rotary fitting 8 with as little friction as possible for adjusting the backrest (see FIG. 1). On the other hand, a force present at the rotary fitting 8 on the output side should not lead to the fact that the rotary fitting 8 is shifted, i.e. for example the backrest is shifted relative to the seat part when a load is exerted on the backrest. In the presence of an output-side force the drive device 1 therefore acts like a load moment lock and for this purpose includes the brake segments 4a, 4b, 5a, 5b on the drive element 2, which in the presence of an output-side force frictionally cooperate with the brake jacket 32 of the brake pot 3 for blocking the drive device 1 and hence prevent a shifting of the rotary fitting 8.

Together with the brake pot 3, the brake segments 4a, 4b, 5a, 5b form a brake means in the manner of a shoe brake. For this purpose, the brake segments 4a, 4b, 5a, 5b each include two contact surfaces 40a, 40b, 41a, 41b, 50a, 50b, 51a, 51b which can be brought in contact with the inside of the brake jacket 32 for frictional braking. As shown in FIG. 3 and FIGS. 4A, 4B, a total of four brake segments 4a, 4b, 5a, 5b are provided, which are arranged in pairs in planes axially offset with respect to each other along the axis of rotation D. The brake segments 4a, 4b and the brake segments 5a, 5b each are located opposite each other in pairs and form two pairs which are arranged in different planes (in the view of FIGS. 4A, 4B the brake segments 5a, 5b are arranged above the brake segments 4a, 4b).

On its side facing the supporting portion 23, 24 the brake segments 4a, 4b, 5a, 5b each include hump-like bulges 52a, 52b, 53a, 53b via which the brake segments 4a, 4b, 5a, 5b support on the drive element 2.

In a rest position before occurrence of the output-side force, the spring elements 21, 22 (of which only the spring element 22 is visible in FIG. 4A) bias the brake segments 4a, 4b, 5a, 5b with respect to the drive element 2. The upper brake segments 5a, 5b shown in FIG. 4A are biased via the spring 22 arranged on the left in FIG. 4A such that the brake segments 5a, 5b support on the supporting portions 23, 24 via the bulges 53a, 53b, but the bulges 52a, 52b are not in contact with the supporting portions 23, 24. Due to the bias of the spring 22, the brake segments 5a, 5b thus are urged into a position in which the brake segments 5a, 5b rest against the brake pot 3 with their contact surfaces 50a, 50b, 51a, 51b and against the supporting portion 23, 24 with their bulge 53a (in the case of the brake segment 5a) or 53b (in the case of the brake segment 5b). Analogously, the brake segments 4a, 4b arranged at the bottom in FIG. 4A are also biased with respect to the drive element 2 via the spring 21, so that the same rest against the brake pot 3 with their contact surfaces 40a, 40b, 41a, 41b and against the supporting portions 23, 24 with their bulges 52a, 52b. Consequently, brake segments 4a, 5a or 4b, 5b arranged one above the other rest against the supporting portions 23, 24 offset with respect to each other. As shown in FIG. 1, the spring 21 furthermore is diametrically opposite the spring 22 and thus exerts a bias on the lower brake segments 4a, 4b in opposite direction.

If, as shown in FIG. 4A, an output-side force is present at the shaft 9, which causes a torque in the direction of rotation A, the same tries to rotate the drive element 2 in the direction of rotation A. The upper brake segment 5b rubs against the brake pot 3 with the left contact surface 51b and the right contact surface 50b and likewise the lower brake segment 4a rubs against the brake pot 3 with the contact surfaces 40a and 40b, so that the brake segments 4a, 5b are wedged between the supporting portions 23, 24 of the drive element 2 and the brake pot 3 and make a frictional contact which prevents a rotation of the drive element 2 with respect to the brake pot 3. Via the brake pot 3, which is non-rotatably connected with the first fitting part 81 (see FIG. 1), the output-side forces hence are introduced into the first fitting part 81, so that a shifting of the rotary fitting 8 is blocked.

In the presence of an opposite output-side force, which causes a torque against the direction of rotation A, the brake segments 4b, 5a analogously get into a frictional contact and block the drive device 1.

A force present on the output side of the shaft 9 hence is blocked and cannot lead to a shifting of the rotary fitting 8. If on the other hand, as illustrated with reference to FIG. 4B, a drive-side force is to be transmitted to the drive element 2 via the adjustment element 6 in direction of rotation B, the adjustment element 6 acts on the brake segments 4a, 4b, 5a, 5b via the engagement elements 61a, 61b, 62a, 62b such that the frictional contact between the brake segments 4a, 4b, 5a, 5b and the brake pot 3 is eliminated and hence the drive element 2 can freely be pivoted in the brake pot 3. In the case illustrated in FIG. 4B, the adjustment element 6 acts on the brake segment 4a via the engagement element 61a arranged on the right side at the bottom of FIG. 4B and on the brake segment 5b via the engagement element 62b arranged on the left side at the top of FIG. 4B and shifts the same such that the brake segments 4a, 5b are moved towards the supporting portions 23, 24 with their bulges 52a, 52b not yet contacting the supporting portions 23, 24. By slightly pivoting or tilting, the brake segments 4a, 5b thus get into a position in which the contact surfaces 40a, 41a, 50b, 51b no longer are in frictional contact with the brake pot 3 and the drive element 2 can freely be pivoted in the brake pot 3. Wedging of the brake segments 4a, 5b shifted or actuated in this way no longer is possible, since an introduction of force into the supporting portions 23, 24, which is necessary for this purpose, no longer is given. The further brake segments 4b, 5a do not prevent this, as during a rotation in the direction of rotation B of the drive element 2 the brake segments 4b, 5a do not get into a frictional contact by interaction with the brake pot 3 and are moved together with the drive element 2 via the bias of the springs 21, 22.

If an oppositely directed drive-side force is introduced, the adjustment element 6 analogously acts on the brake segments 4b, 5a via the engagement elements 61b, 62a and actuates the same such that a frictional contact with the brake pot 3 is eliminated.

As soon as the actuation of the adjustment element 6 is interrupted, i.e. a drive-side force no longer is present at the adjustment element 6, the brake segments 4a, 4b, 5a, 5b are again moved into their biased rest position via the spring elements 21, 22, in which they are in frictional contact with the brake pot 3 with their contact surfaces 40a, 40b, 41a, 41b, 50a, 50b, 51a, 51b and hence block the drive device 1.

Figure 5:
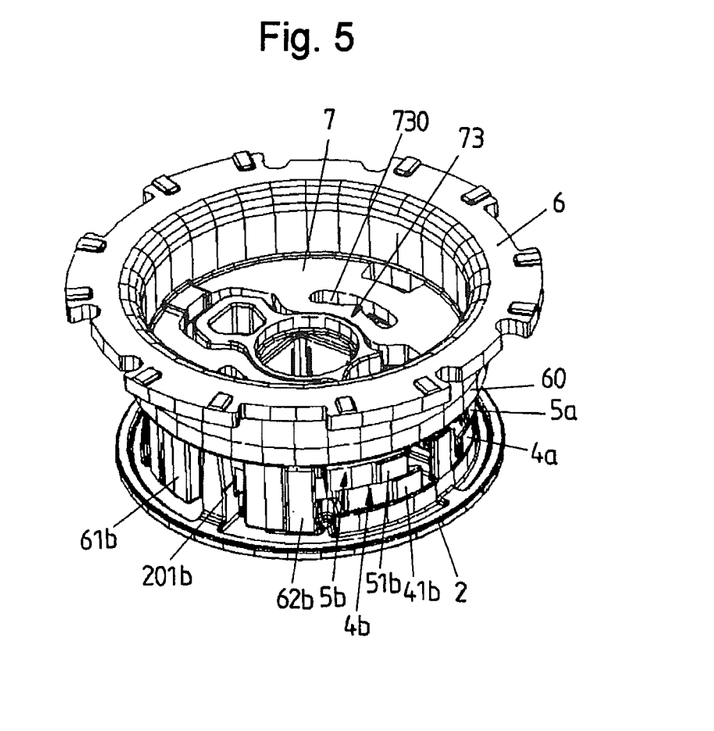
FIG. 5 shows a drive element with an adjustment element arranged thereon, which forms a hand wheel.

FIG. 5 shows a perspective view of the adjustment element 6 at the drive element 2. FIG. 5 clearly shows the brake segments 4a, 4b, 5a, 5b arranged in different planes as well as the engagement elements 61b, 62b of the adjustment element 6 acting on the brake segments 4a, 4b, 5a, 5b.

To connect the adjustment element 6 with the drive element 2, the locking element 7 is provided. The locking element 7 is connected with the drive element 2 by means of an overmeasure adaptation, in that the locking element 7 is retained at the drive element 2 via a collar 73. By providing a slot-shaped recess 730 in the locking element 7, the collar 73 is partly elastic and thus provides a clamping connection of the locking element 7 with the drive element 2.

Figure 6:
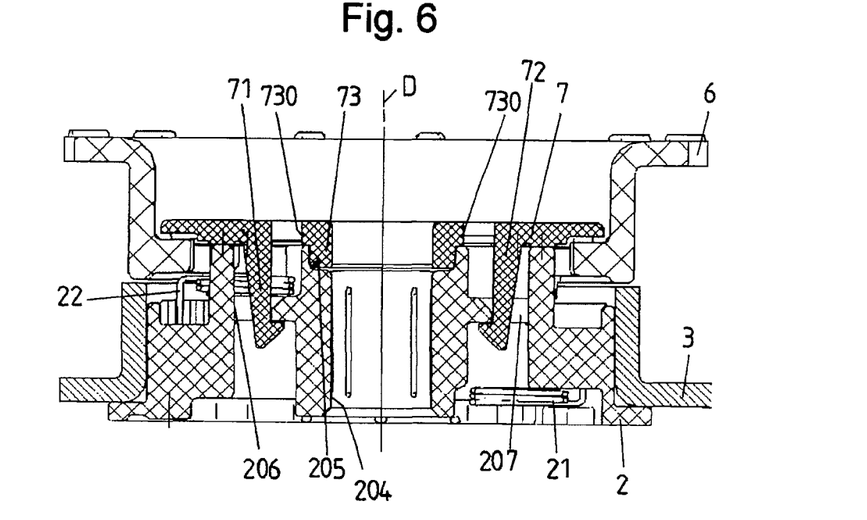
FIG. 6 shows a cross-sectional view through a drive device of an adjustment device with a locking element for connecting the adjustment element with the drive element.
Figure 7:
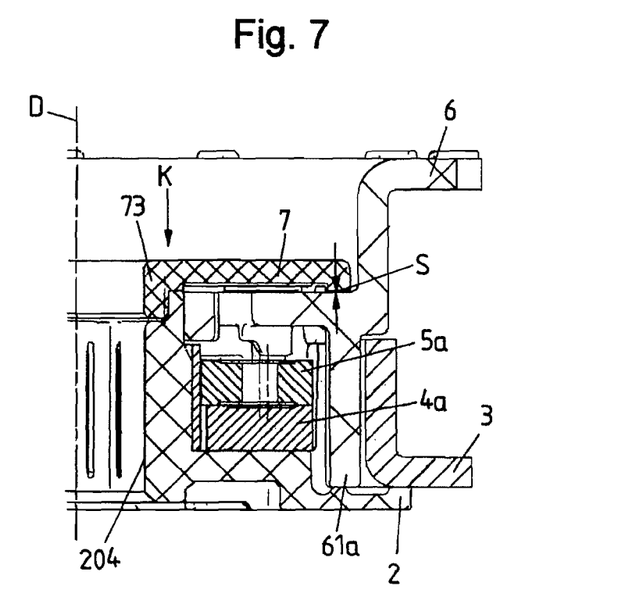
FIG. 7 shows a cross-sectional view through a drive device with a modified embodiment of a locking element for connecting the adjustment element with the drive element.

In addition, as shown in FIG. 6, the locking element 7 can be positively connected with the drive element 2 via form-fit elements 71, 72, which engage in recesses 206, 207 of the drive element 2. Via the locking element 7, the drive device 1 thus can be pre-assembled as a separate unit, wherein the locking element 7 positively connects the adjustment element 6 with the drive element 2 in a pre-assembly position—before connection of the drive device 1 with the rotary fitting 8 and the shaft 9.

The locking element 7 is non-rotatably and positively connected with the drive element 2. At the same time, the locking element 7 retains the adjustment element 6 at the drive element 2 such that the adjustment element 7 can be pivoted relative to the drive element 2 at least by a predetermined pivoting angle about the axis of rotation D, so as to actuate the brake segments 4a, 4b, 5a, 5b. To provide for a smooth pivoting of the adjustment element 6 relative to the drive element 2, a clearance S is provided between the locking element 7 and the adjustment element 6, which can be adjusted in a targeted manner by correspondingly forming and dimensioning the locking element 7.

To connect the shaft 9 with the drive device 1 in the final assembly position, the shaft 9 is inserted into the recess 204 of the drive element 2 and positively connected with the locking element 7 on the rear of the locking element 7 by a crimp K, so that the locking element 7 is firmly connected with the drive element 2.

Figure 8:
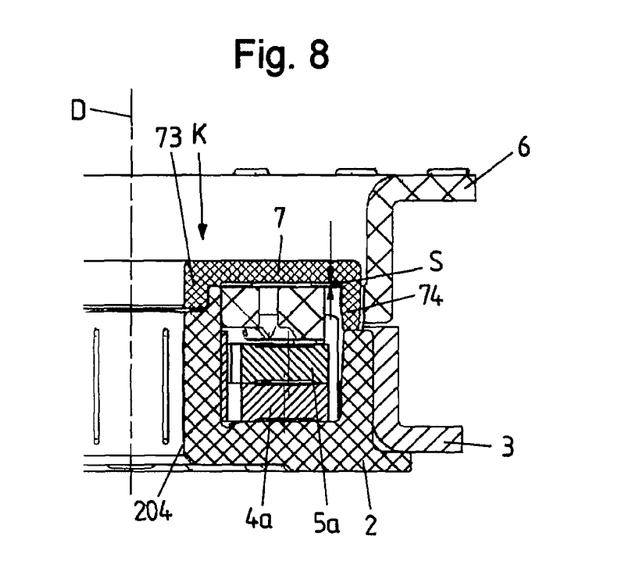
FIG. 8 shows a cross-sectional view through a drive device with a further embodiment of a locking element for connecting the adjustment element with the drive element.

FIG. 8 shows a modified configuration of the locking element 7, which via a support 74 is additionally supported with respect to the drive element 2. In turn, a predetermined clearance S is adjusted between the adjustment element 6 and the locking element 7, in order to ensure a smooth adjustability of the adjustment element 6.

Figure 9:
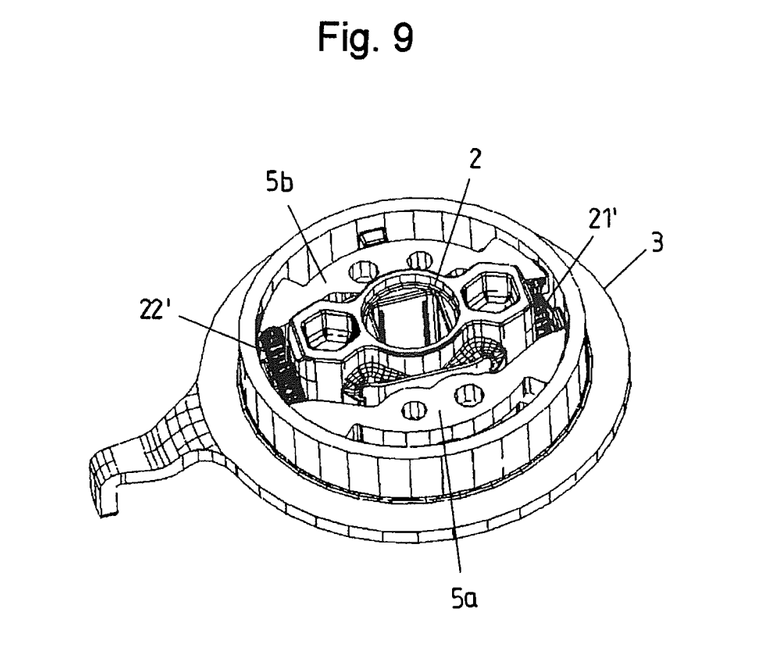
FIG. 9 shows a perspective view of a drive element with brake segments arranged thereon in a brake pot, comprising compression springs for biasing the brake segments.

In the embodiment described with reference to FIGS. 2 to 4, torsion springs are provided as spring elements 21, 22, which exert a bias on the brake segments 4a, 4b, 5a, 5b and can easily be mounted on the drive element 2. In another configuration as shown in FIG. 9, however, compression springs 21', 22' can be provided, which via a compressive force exert a bias on the brake segments 4a, 4b, 5a, 5b and hence bring the brake segments 4a, 4b, 5a, 5b into a rest position in which—in dependence on the direction of rotation of the shaft 9—in the presence of an output-side force the contact surfaces 40a, 41a, 50b, 51b or 40b, 41b, 50a, 51a rest against the brake pot 3 in a braking manner.

Figure 10A:
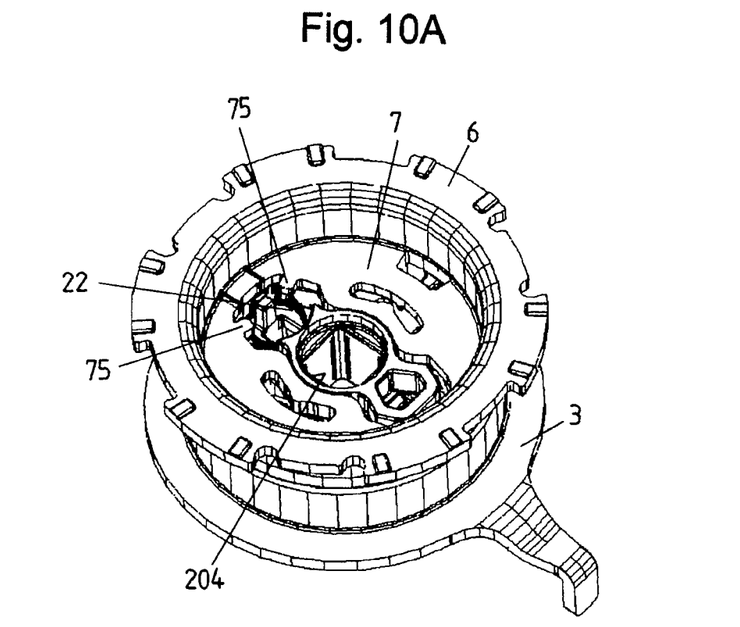
FIG. 10A shows a view of a drive device obliquely from above.
Figure 10B:
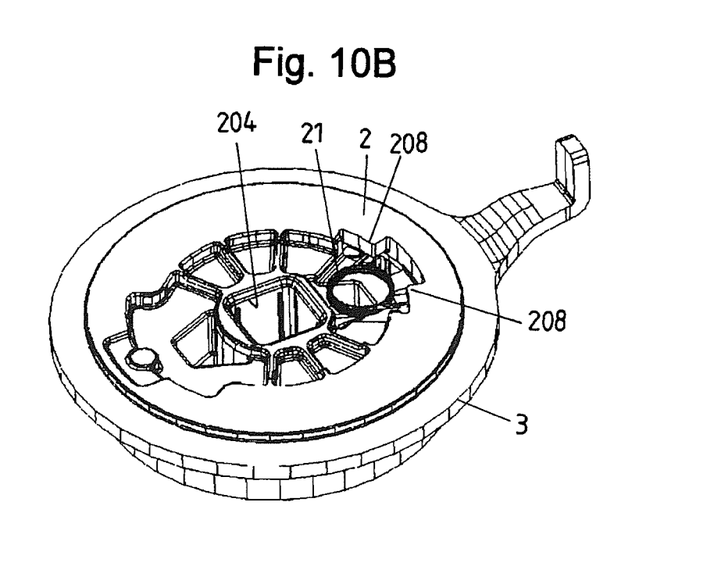
FIG. 10B shows a view of a drive device obliquely from below.

As illustrated in FIGS. 10A and 10B, locking protrusions 75, 208 can be integrated in the base surfaces of the locking element 7 and the drive element 2, which lock the spring elements 21, 22, 21', 22' at the drive element 2 and prevent that the spring elements 21, 22, 21', 22' slip from the drive element 2.

Figure 11A:
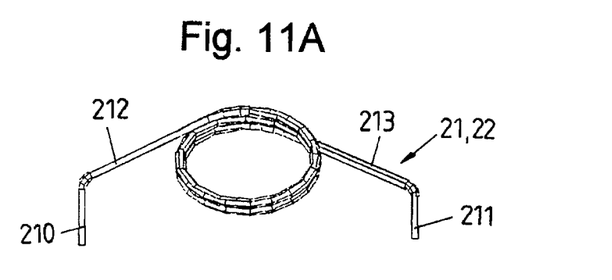
FIG. 11A shows a view of a first embodiment of a spring element for biasing the brake segments.
Figure 11B:
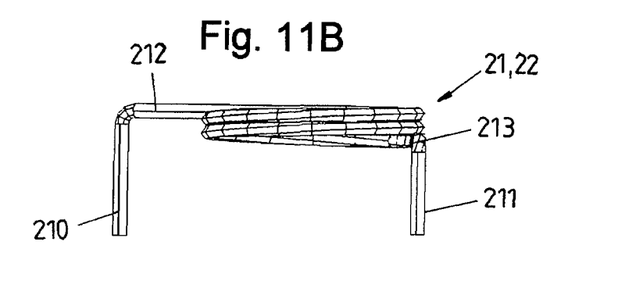
FIG. 11B shows a view of a first embodiment of a spring element for biasing the brake segments.
Figure 12A:
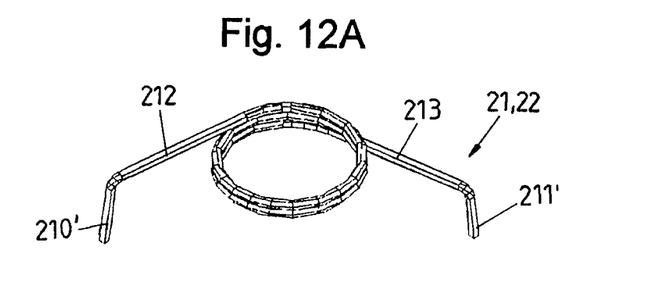
FIG. 12A, shows a view of a second embodiment of a spring element for biasing the brake segments.
Figure 12B:
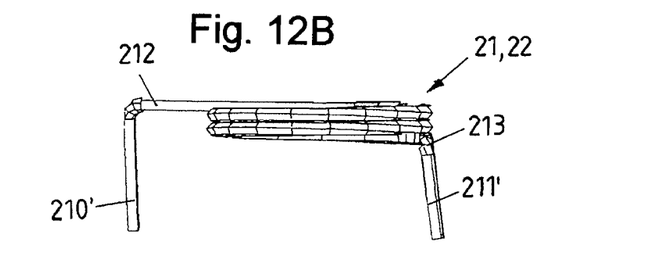
FIG. 12B, shows a view of a second embodiment of a spring element for biasing the brake segments.

FIGS. 11A, 11B and 12A, 12B show different configurations of a spring element 21, 22 formed as torsion spring. In the configuration as shown in FIGS. 11A, 11B the spring element 21, 22 has two ends 210, 211 which are bent at right angles to the spring arms 212, 213. In the configuration as shown in FIGS. 12A, 12B, however, the ends 210', 211' are not bent at right angles relative to the spring arms 212, 213, but such that they describe an obtuse angle relative to the spring arms 212, 213. In this way, it is achieved that in operation the spring ends 210', 211' resting against the brake segments 4a, 4b, 5a, 5b are safely retained at the brake segments 4a, 4b, 5a, 5b and it is in particular prevented that the spring elements 21, 22, 21', 22' move out of the drive element 2.

Figure 14:
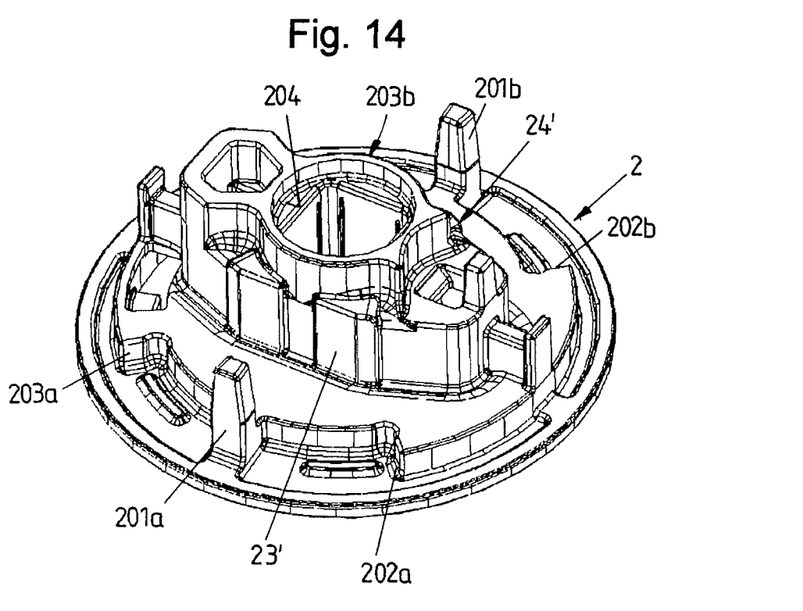
FIG. 14 shows a separate view of a further embodiment of a drive element.

In separate views, FIGS. 13 and 14 show different embodiments of the drive element 2. In the embodiment as shown in FIG. 13, the supporting portions 23, 24 are formed at the drive element 2 in the form of partly overmolded sheet-metal parts. Such configuration is advantageous in particular when the drive element 2 is made of plastics. Via the metallic supporting portions 23, 24 a safe support of the brake segments 4a, 4b, 5a, 5b on the drive element 2 is ensured.

In the embodiment as shown in FIG. 14, no separate sheet-metal parts are provided, but supporting portions 23', 24' are integrally molded to the drive element 2 for example made of plastics. The supporting portions 23', 24' are reinforced, so that the brake segments 4a, 4b, 5a, 5b are reliably supported on the drive element 2.

Alternatively, it is also conceivable to use a drive element 2 made of metal, for example fabricated as an aluminum die-cast part or zinc die-cast part.

The idea underlying the invention is not limited to the embodiments described above, but rather can also be realized in completely different embodiments. In particular, a drive device of the type described is not only usable as backrest inclination adjuster in cooperation with a rotary fitting, but can also be employed for example as drive of a window lifter. For example, in a cable window lifter conventionally using a wrap spring brake a brake means of the type described can be used instead of the wrap spring brake, in order to block a force present on a cable drum on the output side.

The invention claimed is:

1. An adjustment device for adjusting a vehicle seat component, comprising
 a rotary fitting for adjusting the vehicle seat component, the rotary fitting comprising a first fitting part and a second fitting part pivotally mounted with respect to the first fitting part about an axis of rotation,
 a drive device connected with the rotary fitting for driving the rotary fitting, and
 an adjustment element of the drive device for actuating the drive device,
 wherein the drive device is formed to transmit a force acting on the adjustment element on the drive side for adjusting the vehicle seat component to the rotary fitting, but to block a force acting on the rotary fitting on the output side, and
 wherein for blocking the output-side force the drive device includes a brake section fixedly arranged on the first fitting part and at least one brake segment comprising a brake shoe which in the presence of an output-side force at the rotary fitting cooperates with the brake section in a braking manner via a contact surface,
 wherein the at least one brake segment is arranged on a drive element which is non-rotatably connected with a shaft cooperating with the second fitting part for adjusting the vehicle seat component, and
 wherein the adjustment element is connected with the drive element via a locking element.

2. The adjustment device according to claim 1, wherein the adjustment element is formed as a manually operable hand wheel.

3. The adjustment device according to claim 1, wherein the rotary fitting is formed for adjusting the backrest inclination of a backrest forming a vehicle seat component.

4. The adjustment device according to claim 1, wherein in the presence of a drive-side force the adjustment element actuates the at least one brake segment for enabling the drive device.

5. The adjustment device according to claim 1, wherein the brake section is formed as a brake pot in which the at least one brake segment is arranged.

6. The adjustment device according to claim 1, wherein the at least one brake segment is supported on the drive element via a supporting portion.

7. The adjustment device according to claim 6, wherein the supporting portion is formed as partly overmolded sheet-metal part arranged on the drive element or as a plastic portion integrally molded to the drive element.

8. The adjustment device according to claim 1, wherein the at least one brake segment is resiliently biased with respect to the drive element into a position in which the brake segment rests against the brake section in a braking manner.

9. The adjustment device according to claim 8, wherein the at least one brake segment is biased by a spring element into a position in which the at least one brake segment is urged in direction of the brake section radially offset to the outside with respect to the axis of rotation.

10. The adjustment device according to claim 9, wherein the spring element is formed as a compression spring or as a torsion spring.

11. The adjustment device according to claim 9, wherein in the presence of a drive-side force the adjustment element actuates the at least one brake segment for enabling the drive device against the bias into a position in which the at least one brake segment no longer cooperates with the brake section in a braking manner.

12. The adjustment device according to claim 1, wherein the drive element and the adjustment element are pivotally arranged on the brake section.

13. The adjustment device according to claim 1, the adjustment element is pivotally connected with the drive element.

14. The adjustment device according to claim 13, wherein the adjustment element is pivotally arranged on the drive element.

15. The adjustment device according to claim 14, wherein in the presence of a drive-side force the adjustment element becomes operatively connected with the drive element for adjusting the vehicle seat component.

16. The adjustment device according to claim 1, wherein in a pre-assembly position before connecting the shaft with the drive device the locking element is positively retained at the drive element.

17. The adjustment device according to claim 1, wherein in an assembly position the shaft is positively arranged in a recess of the drive element for the non-rotatable connection with the drive element and connects the locking element with the drive element by crimping.

18. The adjustment device according to claim 1, wherein the drive device includes at least two brake segments, of which a first brake segment blocks the drive device in the presence of an output-side force directed in a first direction and a second brake segment blocks the drive device in the presence of an oppositely directed output-side force.

19. The adjustment device according to claim 1, wherein the drive device includes four brake segments which are arranged opposite each other in pairs transverse to the axis of rotation and are offset with respect to each other in pairs axially to the axis of rotation.

* * * * *